United States Patent [19]
Hulak

[11] Patent Number: 6,076,380
[45] Date of Patent: *Jun. 20, 2000

[54] TRACTOR TRAILER AIR HOSE COUPLING LOCKING DEVICE

[76] Inventor: Andrew Joseph Hulak, 7 Middletown Ave., Atlantic Highlands, N.J. 07716

[ * ] Notice: This patent is subject to a terminal disclaimer.

[21] Appl. No.: 08/569,275

[22] Filed: Dec. 8, 1995

Related U.S. Application Data

[63] Continuation-in-part of application No. 08/225,576, Apr. 11, 1994, abandoned.

[51] Int. Cl.$^7$ ....................................................... E05B 73/00
[52] U.S. Cl. .......................... 70/14; 70/57; 70/58; 70/164; 70/258; 280/507
[58] Field of Search .................. 70/14, 58, 232, 70/258, 57, 158, 163, 164, 166, 170; 280/507; 180/287

[56] References Cited

U.S. PATENT DOCUMENTS

| | | | |
|---|---|---|---|
| 4,571,964 | 2/1986 | Bratzler | 70/258 X |
| 5,076,077 | 12/1991 | Renne | 70/14 |
| 5,246,345 | 9/1993 | Adams, Jr. | 70/232 X |

FOREIGN PATENT DOCUMENTS

| | | | |
|---|---|---|---|
| 0022102 | 1/1981 | European Pat. Off. | 70/232 |
| 2458410 | 2/1981 | France | 280/507 |

*Primary Examiner*—Lloyd A. Gall
*Attorney, Agent, or Firm*—James K. Luchs

[57] ABSTRACT

A locking device to fit over a tractor trailer or container carrier air hose coupling consists of a rectangular cage of cut tubular steel with perpendicular welded flange and adjacent hole into which fits an angle flange with welded pin. Alternatively the locking device with semicircular flanges can be fabricated from sheet steel in a continuous bending, stamping, welding and laser drilling operation. A high impact strength plastic is required when the locking device is produced by injection molding. In use a flanged cage is placed over an air hose coupling with the hole directly over the air hole, and a pin or tongue insert is inserted while the hasp of the padlock passes through matching hasp holes. The locking device can be connected and color coded and used for an inventory control system.

11 Claims, 4 Drawing Sheets

TRACTOR TRAILER AIR HOSE COUPLING LOCKING DEVICE

This is a continuation-in-part of Ser. No. 08/225,576 filed Apr. 11, 1994 now abandoned.

FIELD OF THE INVENTION

The invention relates to devices used to prevent the theft of container carriers and tractor trailers. In particular the invention relates to a locking device fitting over an air hose coupling secured with a padlock.

1. Background of the Invention

A need exists for a simple and effective means for preventing attachment of air hoses to a parked trailer or container carrier and driving away with it. Often a unit prepared for a particular purpose is driven away and later found to be unsatisfactory for that purpose.

A number of more recent references teach locking or security devices for "gladhand" air hose couplings and include: U.S. Pat. Nos. 4,226,103; 4,325,237; 4,693,096; 4,732,018; 4,738,126; 5,076,077 and 5,129,243. These prior art devices were intended to prevent unauthorized attachment of air hoses without removal of the device from the "gladhand" air hose coupling.

2. Summary of the Invention

A locking device for an air hose coupling on a tractor trailer or container carrier comprises two components (1) a flanged rectangular cage or cover fitting over the coupling with a hole positioned over an air supply hole, and (2) a flange with a pin or insert fitting through the hole into the air supply hole; such that when the hasp of a padlock is inserted through hasp holes on the flanges and the padlock is locked the air hose coupling is secured.

A preferred device comprises a rectangular cage with a semicircular flange and a tongue shaped insert on a semicircular flange protected from weathering by a zinc or nickel coating on steel. The cage fitting over the emergency side air hose coupling can prevent rain or snow from entering the air hole.

The locking device can be manufactured from sheet steel in a continuous operation with a rectangular cage and semicircular hasp hole flanges wherein a tongue shaped insert passes through the cage into the air hole. It can be injection molded from a high impact strength plastic. It can be produced from rectangular tubing and angle flanges with a pin insert using less sophisticated cutting, drilling and welding techniques.

The invention provides a padlock key inventory and control system as a means for securing a fleet of similar looking civilian or military trailers and/or container carriers against unauthorized movement.

DETAILED DESCRIPTION OF THE INVENTION

Because of the grease buildup on the commonly used king-pin lock it is a dirty job to crawl underneath to attach or remove. If a driver does not notice it is in place it may be accidentally damaged. Frequently the cylindrical lock must be removed with a torch even if the grease smokes or burns during the process. It has now been discovered that it is more effective to prevent unauthorized movement of air brake equipped trailers or carriers with this novel rectangular cage and tongue/pin device. In addition to acting as a two piece locking device which is rugged and easy to use, during winter this device prevents water from entering the air hole and freezing so that ice in the line will prevent the brakes from being released. Attempts to break this device covering the emergency side air coupling can disable the trailer or carrier in that the brakes will remain locked. The common name for the coupling is "gladhand".

The device can be conveniently constructed from engineering plastic by injection molding or aluminum, cast iron or steel using a variety of metal working techniques. The two pieces can be stamped, welded and drilled in either a continuous or batch process. Because of the simple and rugged nature of the device it can be produced using techniques such as cutting and welding as well as die and mold casting. The two pieces can optionally be connected with a chain or lanyard so that they can not be separated when not in use. This connection can be made through the hasp holes or by other means.

While a simple rectangular cage or cover is adequate to fit over about 90% of couplings (gladhands) now in use, some require that the cage or cover have an irregular shape or that a cutout be provided. With either irregular shape or cutout this two piece gladhand locking device is universally suitable for either tractor trailers or container carriers used in international trade and commerce.

DETAILED DESCRIPTION OF THE DRAWINGS

Figure 1:
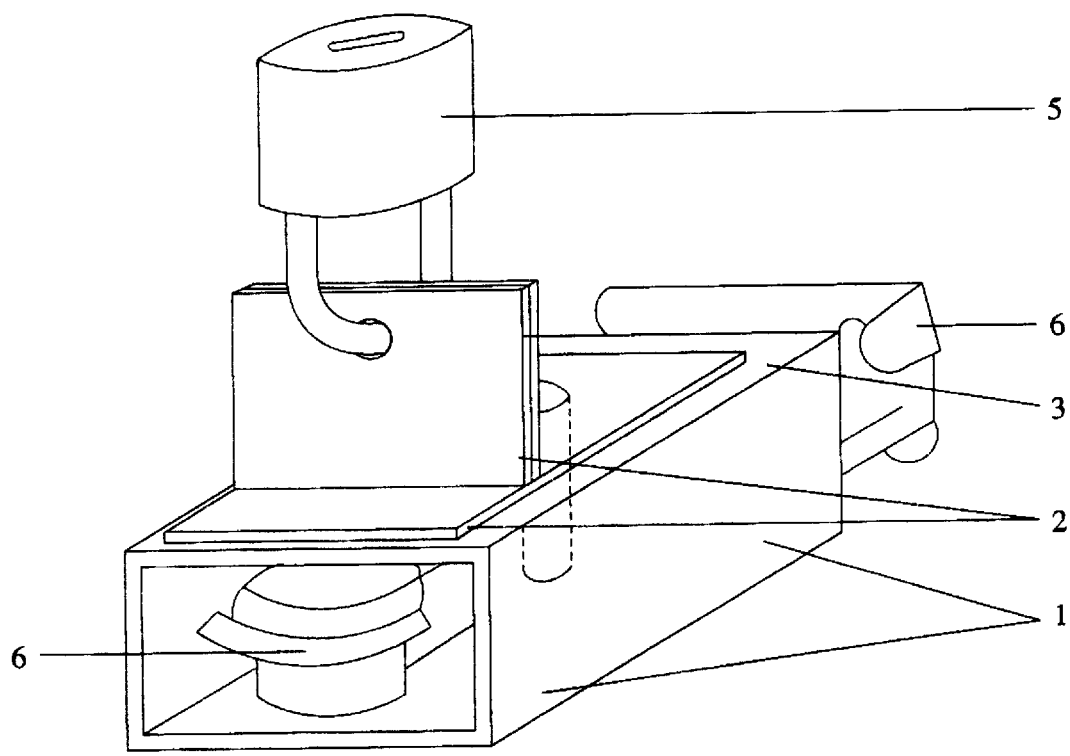
FIG. 1 The device is shown in a locked position on an air supply coupling.

FIG. 1 The device consists of two pieces the larger of which is (1) a holed rectangular cage and (2) attached semicircular flange with hasp hole and the smaller piece is (3) a semicircular flange with hasp hole and (4) a tongue insert fitting through a hole in the cage and into the air hole of (6) a gladhand coupling secured with (5) a locked padlock with its hasp through the matching hasp holes on the semicircular flanges.

Figure 2:
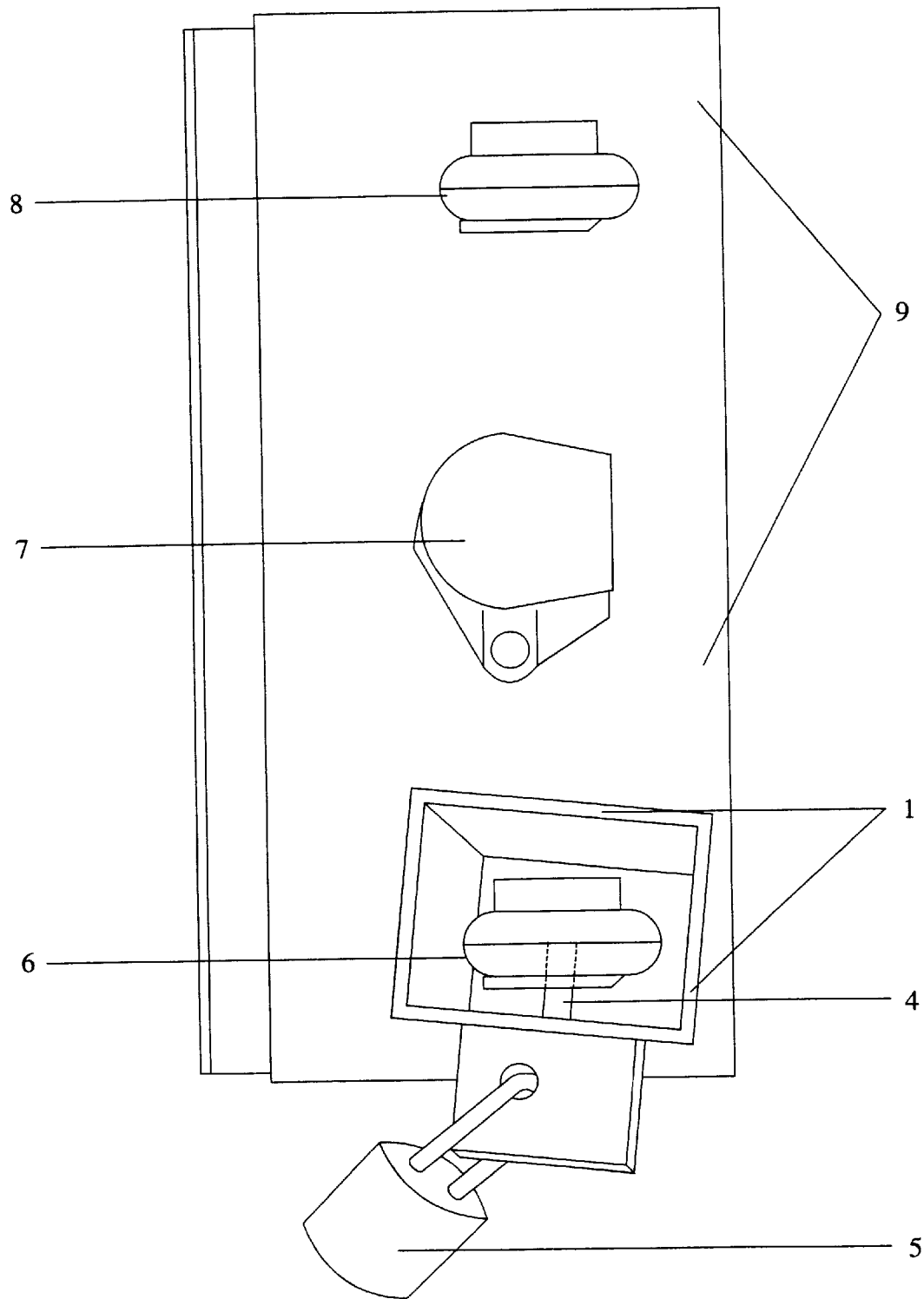
FIG. 2 The device is shown as it would be placed on the emergency side air supply coupling next to the light hookup on a trailer.

FIG. 2 The positioning of the two piece locking device secured with (5) a padlock is shown where (1) a rectangular cage with a pin hole and a welded flange with a hasp hole and an angle flange with (4) a welded pin and (6) an emergency side air hose coupling and (7) a trailer light connection and (8) a supply side air coupling mounted on (9) a trailer header panel.

Figure 3:
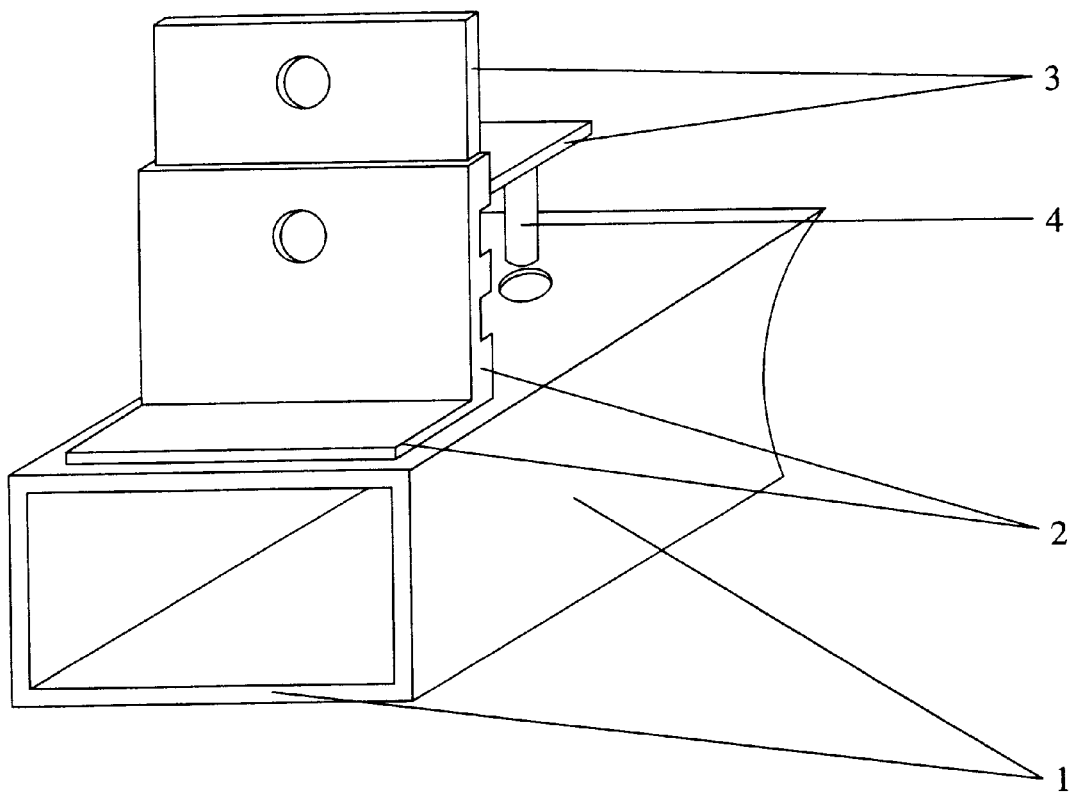
FIG. 3 A tongue and cage device is illustrated.

FIG. 3 The gladhand locking device as illustrated is a preferred version with (1) an irregular cage with (2) a semicircular flange with hasp hole through which (4) a tongue insert of (3) a semicircular flange fits.

Figure 4:
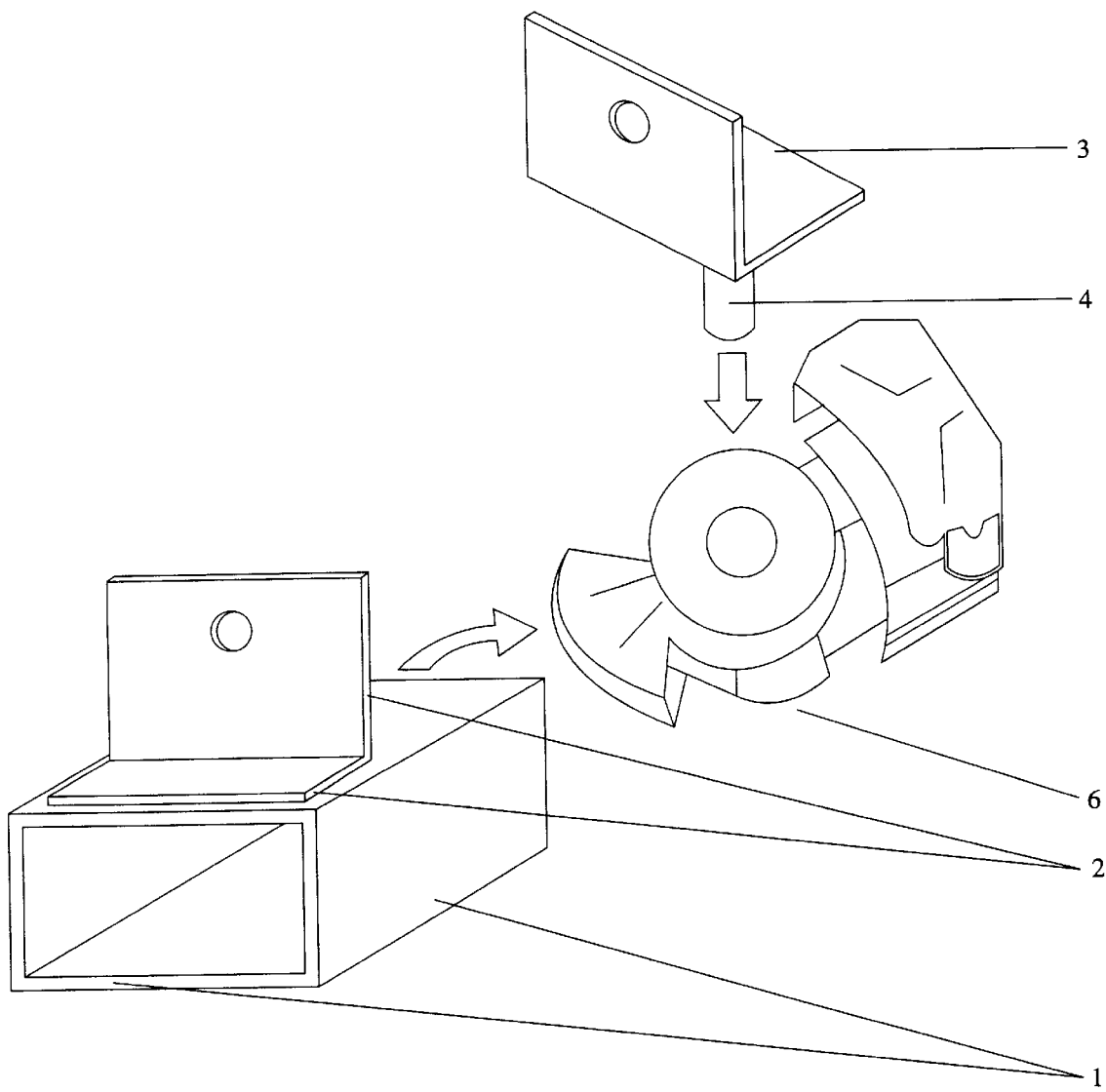
FIG. 4 A diagram drawing illustrates how the two parts of the device fit over an air hose coupling.

FIG. 4 The two pieces of the device are shown as being moved to fit where (1) rectangular cage with hole and integral flange with hasp hole is being moved to cover (6) a gladhand air supply coupling such that when the hole is over the air hole (4) a pin insert on (3) a semicircular flange fits through the hole and into the air hole and the hasp holes will be adjacent so that a padlock hasp will secure the device to encase the gladhand.

The invention has industrial applicability for military as well as civilian use to prevent or deter the unauthorized movement of air brake equipped tractor trailers or container carriers. The following procedures and examples which are not intended to be limiting illustrate the practice of the invention.

PROCEDURE A

A length of rectangular structural steel was cut into a section of the size to form a cage over a standard gladhand air supply or emergency side coupling. A hole was drilled into this cage larger than the size of the pin. An angle iron was cut and drilled with a hasp hole and welded on the plane of the cage with the drilled pin hole to produce a perpendicular flange. A second angle iron was drilled with a hasp hole and a pin hole. A pin was inserted and welded therein. Rough edges were smoothed so the two pieces of the locking device could be safely handled.

PROCEDURE B

Starting with sheet steel the cage is formed by angle bending and stamping into rectangular shape with semicircular flange. Holes are laser drilled and the touching edges of the cage are welded. The semicircular flange with curved tongue insert is formed from the sheet steel and the hasp hole is similarly laser drilled. The pieces can then be color coded, painted or alternatively zinc or nickel coated for protection.

PROCEDURE C

Using a high impact strength plastic of the type commonly referred to as Engineering Plastics and used for automotive parts two molds are used to produce the two pieces for the locking device at a rate of about one every four minutes. Modification of the cage for irregular shape is facilitated by use of plastic rather than metal. Where it is desirable that the two pieces not be allowed to separate, a chain or lanyard connection through the hasp holes can be employed for either metal or plastic locking devices. This can be removed either temporarily or permanently.

EXAMPLE 1

A glandhand locking device comprising two welded and drilled steel pieces were fabricated as in Procedure A and used as shown in FIG. 2 to cover an emergency side air coupling and was conveniently secured with a padlock so that a trailer prepared for a specific purpose could not be moved without obtaining the key. The device was evaluated to be superior to the conventional king-pin devices which must periodically be burned off if damaged by accidents or attempts at unauthorized movement. Twenty eight of these devices were used with an inventory control system involving sign in and sign out of keys for a fleet operation where both military and civilian trailers and carriers are being repaired and cleaned.

EXAMPLE 2

A locking device fabricated from either metal or plastic by any Procedure is connected using a chain or lanyard attaching the two pieces through the hasp holes allowing the device to be stored or shipped as a unit in a cardboard box. Optionally a padlock and keys can be temporily attached so that the unit can be taken out and used at once.

EXAMPLE 3

Locking devices fabricated by any of Procedures A or B or C with either semicircular or rectangular flanges and cutout or irregular shape provide suitable coverage of all types of gladhand emergency and supply side air hose couplings of the types known to be presently used in international commerce.

EXAMPLE 4

In an inventory control system of the type mentioned in Example 1 the locking devices can be color coded or painted as an alternative to being black steel or dull zinc or bright nickel. Red for instance could be used in the case the trailer contained explosives or ammunition. Keys to the padlocks on the locking devices are controlled using a sign in and sign out sheet as a method of inventory control. When maintenance and cleaning and/or repair has been completed on a unit the operator secures the device on the emergency side gladhand with the padlock and the key is signed in thereby indicating that the unit is ready. The driver assigned to take that unit signs out the key and will only be able to move that unit. The driver unlocks the padlock and removes the device and these are returned to be used again in this system of inventory control.

What is claimed is:

1. A two piece locking device for a tractor trailer or container carrier air hose coupling secured with a padlock through matching hasp holes comprising:

(1) a hasp holed flange and an insert hole on a face of a rectangular cage, and (2) a hasp holed flange with a tongue or pin insert which fits through the insert hole and into an air hole in the coupling.

2. The locking device of claim 1 fabricated from iron or steel.

3. The locking device of claim 2 comprising semicircular flanges and a tongue insert.

4. The locking device of claim 3 fabricated from sheet steel and zinc coated for protection.

5. The locking device of claim 1 fabricated from plastic.

6. The locking device of claim 1 with matching hasp holes through which a padlock hasp passes to allow the device to be secured in place to prevent water from entering an emergency side air line and freezing.

7. A two piece gladhand locking device fabricated from sheet steel comprising:

(1) a rectangular holed cage with an adjacent perpendicular semicircular flange with hasp hole; and (2) a hasp holed semicircular flange with a tongue insert.

8. The device of claim 7 wherein the hasp holes are laser drilled.

9. The device of claim 8 fabricated by a continuous process of stamping and bending.

10. The device of claim 9 where the rectangular holed cage is welded.

11. The device of claim 10 where rough edges are removed and pieces (1) and (2) are protected with zinc coating.

* * * * *